(No Model.)

N. WASHBURN.
CAR WHEEL.

No. 258,266. Patented May 23, 1882.

Witnesses.
S. N. Piper.
E. B. Pratt.

Inventor.
Nathan Washburn.
by R. H. Eddy att'y

UNITED STATES PATENT OFFICE.

NATHAN WASHBURN, OF ALLSTON, MASSACHUSETTS.

CAR-WHEEL.

SPECIFICATION forming part of Letters Patent No. 258,266, dated May 23, 1882.

Application filed October 24, 1881. (No model.)

*To all whom it may concern:*

Be it known that I, NATHAN WASHBURN, of Allston, of the county of Suffolk and State of Massachusetts, have invented a new and useful Improvement in Railway-Car Wheels; and I do hereby declare the same to be described in the following specification and represented in the accompanying drawings, of which—

Figure 1:
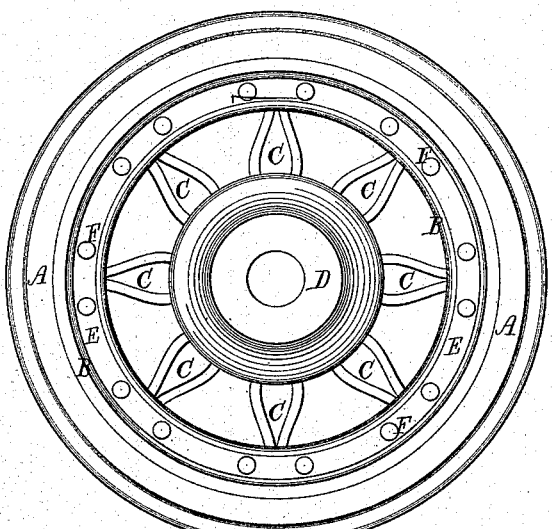

Figure 1 is a side elevation, Fig. 2 a longitudinal section, and Fig. 3 a transverse section, of a car-wheel embodying my invention, the nature of which is defined in the claims hereinafter made.

The said wheel has a steel tire, A, a cast-iron rim, B, wrought-iron spokes C, and a cast-iron hub, D, besides which it has arranged within the rim, and on opposite sides thereof, two wrought-iron or steel flat rings, E, connected by a series of bolts, F, extending from one to the other of said rings, and going through the rim laterally thereof, all being substantially as represented.

Figure 2:
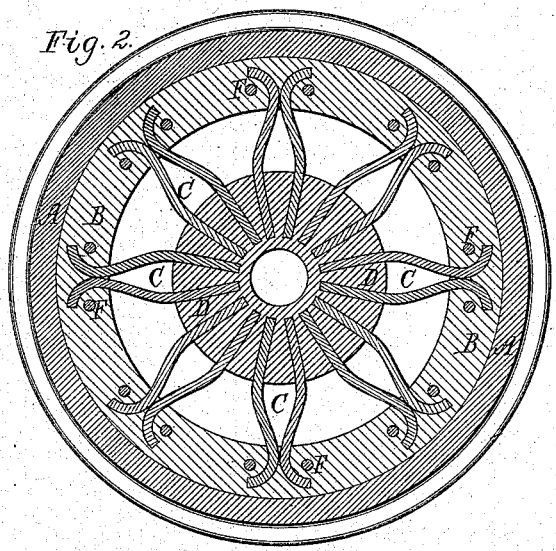
Figure 3:
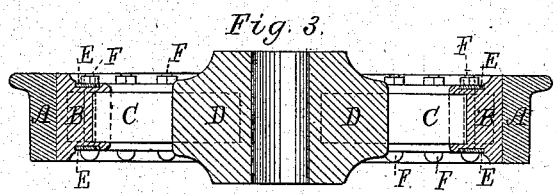

In making the said wheel the tire in a sufficiently-heated state, and the rings with their connections, together with the spokes duly arranged, are placed within the mold for founding the body or rim thereof, after which the said body or rim is to be cast against the inner periphery of the tire, and also about the bolts and rings and upon the spokes, in which case the rings and bolts will be within the tire, in manner as shown in Figs. 2 and 3, and the spokes will be within the rim in manner as represented in Fig. 2. Finally the hub is to be cast upon the spokes. The rim riveted to the tire in the process of casting the rim becomes strongly reenforced by the rings, and their connecting-bolts. These latter may be screw-bolts provided with heads and nuts; or each bolt may be in the form of a rivet, or may have screws on it to enter the rings.

A car-wheel made as described becomes very strong and durable, with little, if any, liability of its rim or tire becoming cracked or broken while the wheel may be in use.

What I claim as my invention is as follows, viz:

1. The combination of the car-wheel body or rim and the two metallic rings, and their connecting-bolts arranged in such body or rim, substantially as set forth.

2. The combination of the two metallic rings, their connection-bolts, and the series of spokes, with the rim and hub arranged with and cast upon them, as specified.

3. The combination of the two metallic rings, their connection-bolts, the series of spokes, and the steel tire with the hub cast upon the spokes, and with the rim cast within and against the tire and upon the rings and bolts, all substantially as set forth.

NATHAN WASHBURN.

Witnesses:
R. H. EDDY,
E. B. PRATT.